Dec. 15, 1959 M. WINTER Re. 24,755
POWER-OPERATED DENTAL ASPIRATOR
Original Filed Oct. 31, 1956 2 Sheets-Sheet 1
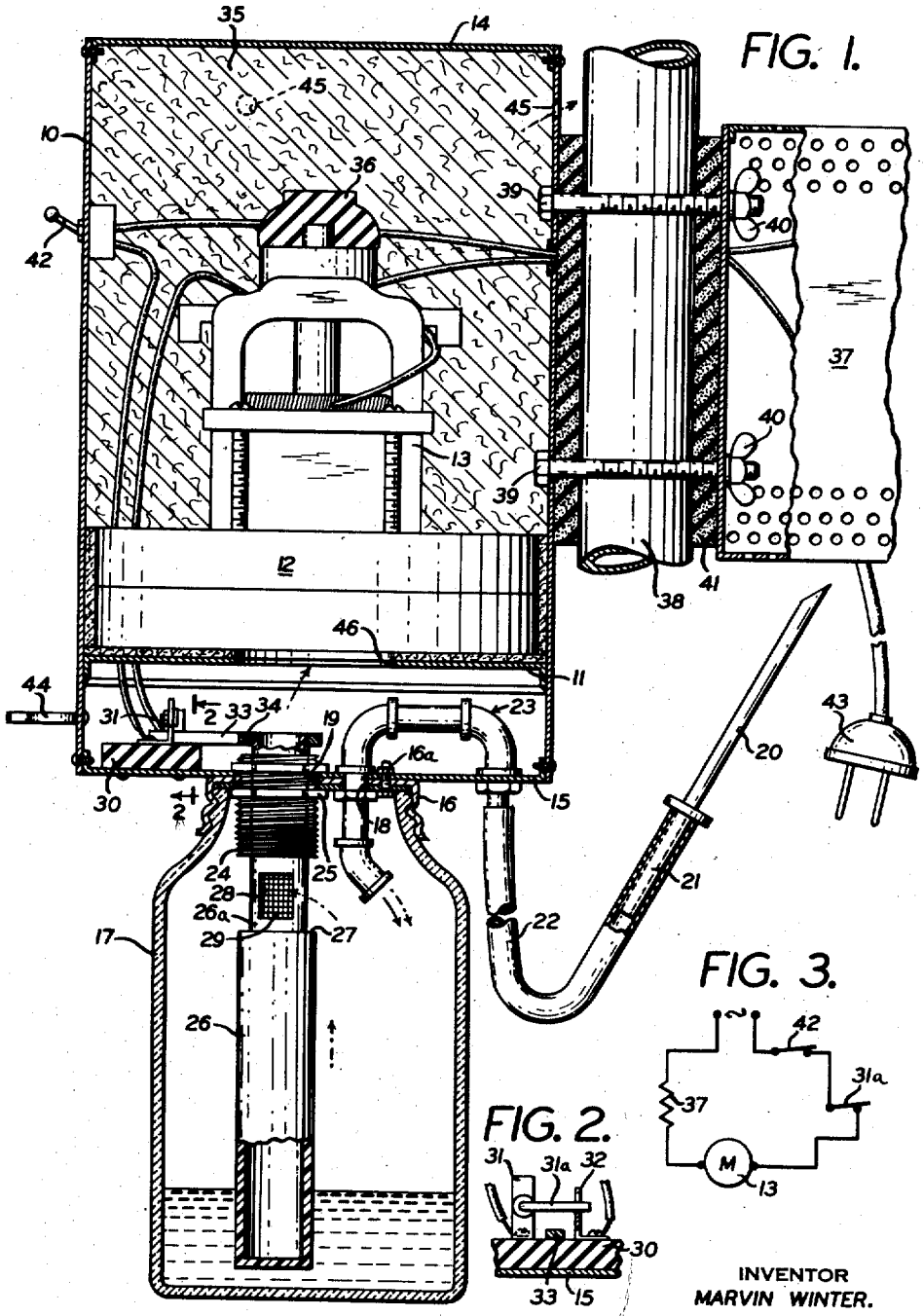
INVENTOR
MARVIN WINTER.
BY
Churchill, Weymouth & Engel
ATTORNEYS.

POWER-OPERATED DENTAL ASPIRATOR

Original Filed Oct. 31, 1956 2 Sheets-Sheet 2

INVENTOR
MARVIN WINTER.
BY
Churchill, Weymouth & Engel
ATTORNEYS.

United States Patent Office

Re. 24,755
Reissued Dec. 15, 1959

24,755

POWER-OPERATED DENTAL ASPIRATOR

Marvin Winter, Great Neck, N.Y., assignor, by mesne assignments, to The Pelton & Crane Company, Charlotte, N.C., a corporation of Michigan Original No. 2,821,021, dated January 28, 1958, Serial No. 619,618, October 31, 1956. Application for reissue May 7, 1958, Serial No. 735,657

16 Claims. (Cl. 32—33)

Matter enclosed in heavy brackets [ ] appears in the original patent but forms no part of this reissue specification; matter printed in italics indicates the additions made by reissue.

The present invention relates to a power-operated dental aspirator and aims to provide certain improvements therein. This application is a continuation-in-part of my copending application, Serial No. 543,927, filed October 31, 1955, now abandoned.

In various dental techniques, the need for removing from the mouth of a patient the accumulation of saliva, blood, broken teeth, bone chips, filling material, etc., so that the dentist may carry on without interruption, has long posed a problem. This problem is acute since the conventional dental saliva ejectors do not function to remove solid material from the mouth. The only power-operated dental aspirator now available is a massive cabineted apparatus which is too costly and space-consuming for the average dentist to indulge. Also, there has been recently introduced to the dental profession an electronic device for excavating teeth, which device, in use, involves continuously feeding a slurry or abrasive coupled with a water supply, and requires that the slurry and water be continuously removed from the mouth of the patient, which removal cannot be accomplished with a conventional dental saliva ejector.

A primary object of the present invention is to provide a power-operated dental aspirator which is a compact unit that can be clamped to the light standard of a conventional dental unit or attached to a wall in proximity to such dental unit.

A further object of the invention is to provide a dental aspirator of the character set forth which can be readily assembled from standard parts and fittings and can be installed in a few minutes without the aid of special tools or plumbing connections.

A still further object of the invention is to provide a dental aspirator unit of the character set forth which will provide a powerful foolproof suction at the aspirator tip.

A still further object of the invention is to provide as part of the unit, either a readily removable collecting chamber for waste, consisting of water, saliva, debris, etc., or means for automatically discharging said waste when operation of the power aspirator is stopped.

A still further object of the invention is to provide a device of the character set forth with automatic cut-off means for preventing any of the waste being drawn through the power-operated blower.

A still further object of the invention is to provide a unit of the character described which is simple in construction and can be sold at a price that all dentists can well afford.

The foregoing and other objects of the invention, not specifically enumerated, I accomplish by providing a compact assembly comprising a housing, an electric motor-operated blower within said housing, a chamber below said blower, means providing air communication between said chamber and the intake side of the blower, means for establishing fluid communication between the chamber and an aspirator conduit exteriorly of the chamber, said chamber being adapted to receive and collect liquid and debris drawn through the aspirator tube and means associated with said chamber for discharging the liquid and debris collected therein. The device also includes means for preventing collected liquid and debris from being drawn into the blower. The invention will be readily understood from the detailed description which follows, when considered in connection with the accompanying drawings, wherein:

Figure 1 shows a diametrical section through a dental aspirator embodying my invention, mounted on the light standard of a dental unit.

Fig. 2 shows a section taken along the line 2—2 of Fig. 1 showing a detail of the invention.

Fig. 3 shows a diagram of the electric wiring of the unit.

Figure 4:
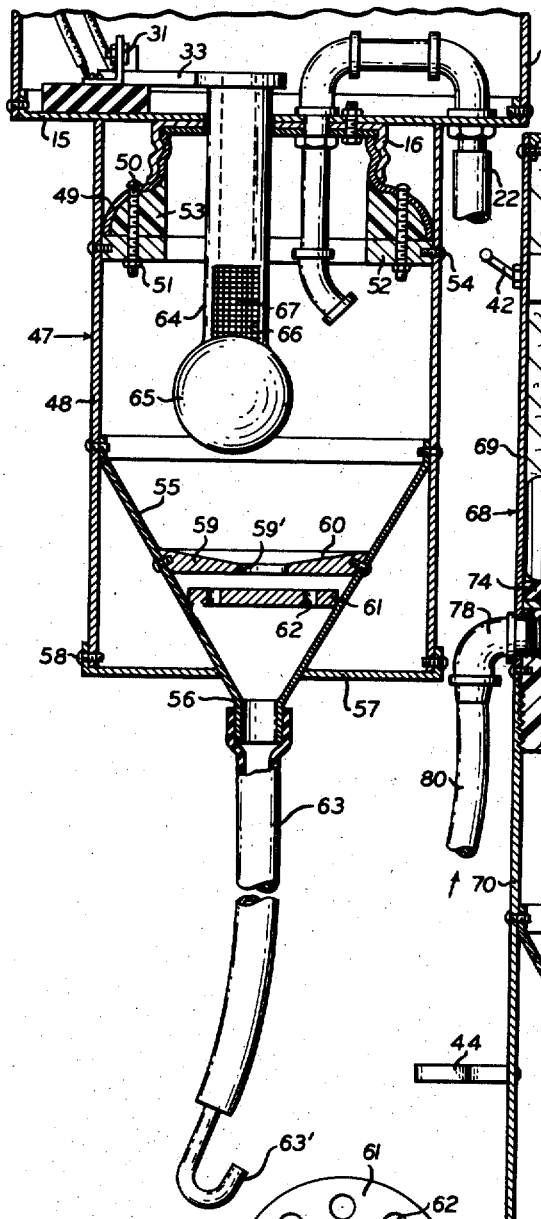
Fig. 4 shows a diametrical fractional section through a second embodiment of my invention.

Referring first to Figs. 1 to 3 of the drawing, the dental aspirator therein shown consists essentially of a canister-like housing 10 of generally cylindrical form having secured therein in spaced relation to the lower end, an open false bottom or partition 11 upon which is supported an air blower 12 coupled to an electric motor 13, the housing being fitted with a removable top plate 14 and a removable bottom plate 15, to which plate 15 is permanently affixed a container closure cap 16 by suitable means such as bolts 16a, said cap facing outwardly and being formed with a screw-thread adapted to accommodate and support a conventional Mason jar 17 or other suitable container in assembled relation to the housing 10. The bottom plate 15 and the closure cap are formed with two sets of registering openings 18 and 19, to provide an entry into the jar 17 and an exit from the jar 17 to the blower 12 of air which will be drawn through an aspirator tube 20 when the blower is in operation.

The aspirator tube 20 may be of any desired construction and, as shown, is formed of plastic and is removably and frictionally held in a second plastic tube 21 inserted in one end of a flexible hose 22, the opposite end of the hose being connected through a U-shaped conduit 23 mounted in the bottom of the housing between the bottom plate 15 and the false bottom 11, one end of the U-shaped conduit extending through the registering openings 18. The U-shaped conduit 23 may be suitably formed from conventional pipe nipples and elbows and clamped to the bottom plate 15 by suitable nuts. Mounted within the second set of registering openings 19 is a threaded pipe nipple 24 having portions thereof extending above and below the bottom plate and being held thereto by securing nuts 25.

Slidably mounted in the nipple 24 is a floating tube 26, preferably formed of synthetic resin, the bottom of which is preferably closed and the upper portion 26a of which is of reduced diameter to provide a shoulder 27 for a purpose which will presently be explained. The reduced portion of the tube 26 is formed with a window 28 therein which is preferably covered with wire gauze 29 to prevent solid portions of debris from gaining entrance into the tube and eventually into the blower.

Mounted on the inner face of the bottom plate 15 is an insulating block 30 which carries a secondary electrical switch consisting of a bracket 31 on which a pivoted arm 31a is mounted to be gravity-actuated to closing contacting engagement with a bracket arm 32. The uprights of the switch part brackets are laterally spaced apart, as best shown in Fig. 2, and extending between said uprights is an operating arm 33 carried at the top of the floating tube 26 and adapted to unseat the pivoted arm 31a of the switch from its contact 32 after a predetermined amount of upward movement of the floating tube by liquid collecting in the jar. The arm 33 may be formed as a part of a plastic nut 34 threaded on the upper end of the tube 26. Of course, the floating tube 26 may be so calibrated or weighted that it will move the operating arm 33 from its position of rest against the insulating block 30 into switch-opening position when the jar 17 is about two-thirds full of liquid. In order that the gravity-actuated switch may not be thrown out of operating position, the shoulder 27 is so located in relation to the lower end of the nipple 24 so as to limit the upward movement of the floating tube as it rises in response to an increase in the volume of liquid collected in the jar 17.

The motor 13 which I prefer to use is a universal A.C.—D.C. motor as conventionally found in tank-type vacuum cleaners and is packed within the housing 10 by a suitable air permeable sound insulating material such as fiber glass wool 35 and a rubber cap 36 engaging over the motor bearing housing. A motor of the character specified, however, operates at too high a speed and creates too strong a suction effect at the free end of aspirator tube 20, wherefore I prefer to connect in series with the motor a suitable resistance carried in a resistance box 37 to reduce speed and the subsequent suction effect. The resistance box may constitute a part of the unit and the whole may be clamped onto a light standard 38 of a conventional dental unit by means of four mounting bolts 39 and wing nuts 40, the housing 10 and resistance box 37 being disposed on opposite sides of the light standard and cushioned therefrom by a sponge rubber spacing sheet 41. To facilitate control of the aspirator, a manually operable primary switch 42 is interposed in the circuit. Current may be supplied to the motor from a conventional wall outlet by a plug 43. For convenience, the housing 10 may also be provided with a bifurcated spring clip 44 adapted to hold the hose end of the aspirator tube. In lieu of mounting the unit on the light standard 38, one wall of the resistance box may be provided with brackets for mounting the unit onto a wall.

In the operation of the embodiment of the invention above described, let it be assumed that the unit, including the Mason jar 17, is in position and the dentist is desirous of using the power-operated aspirator. The plug 43 will be inserted into the wall outlet and the manual primary switch 42 will be moved to "on" position. The motor will then rotate and the blower will create a suction action at the free tip end of the aspirator tube 20 which will be inserted into the mouth of the patient by a dental assistant while the dentist is operating on the patient. The suction action will withdraw the accumulation of saliva, blood, broken teeth, filling material, etc., and water, where used in conjunction with the operating technique, which debris will be deposited in the Mason jar, while the accompanying sucked-in air, as indicated by the broken arrows, will pass from the Mason jar through the screen window 28, then through the open end of the floating tube 26, thence through the opening 46 in the false bottom 11 through the blower and out through openings 45 in the housing 10. The floating tube having a specific gravity somewhat less than one, it will not rise until a predetermined volume of liquid has been collected in the jar. As aforementioned, the weight of the floating tube is such that when the jar is approximately two-thirds full, the tube will have moved upwardly through the nipple 24 to cause the operating arm 33 to unseat the pivoted arm 31a of the secondary switch and break the electric circuit to the motor. By this action, all danger of either liquid or solid debris being drawn into the blower is averted. Periodically, the jar 17 may be unscrewed from the cap 16 and emptied and cleaned.

In the embodiment shown in Fig. 4 the structure of the unit, with the exception of the Mason jar 17 and the specific character of the floating tube 26, are the same as disclosed in Figs. 1 to 3, and hereinbefore described. In the embodiment shown in Fig. 4, in lieu of the Mason jar 17, I have provided a receptacle 47 consisting of a cylindrical member 48 having a diameter to enclose the closure cap 16 and fit within the hose connection 22 leading from the aspirator tube 20. Within the member 48 there is secured a screw-threaded head 49 adapted to engage the thread of the closure cap 16. The head 49 consists of a metal shell which is secured by bolts 50 and nuts 51 to an annular ring 52, the space between the shell and one face of the ring being filled with a composition 53 to provide a relatively smooth bore through the head. The annular ring 52 is secured within the cylinder 48 by fastening means 54. Also mounted within the cylindrical member 48 is a funnel-like member 55 having a drain outlet, the lower end 56 of which extends beyond the lower end of the member 48 through a bottom closure 57 which is secured to the member 48 by securing means 58. Secured within the funnel 55 above its drain outlet end is an annular ring or valve seat 59 having an inverted conical top face 60, and a central opening therethrough 59'. Somewhat below the bottom face of the annular ring or valve seat 59 there is disposed within the funnel a floating valve disc 61 having a plurality of openings 62 therethrough arranged in a circle which is concentric with the ring and of larger diameter than the opening 59' in the valve seat 59. Adapted for connection to the outlet end 56 of the funnel is a drain tube 63, the free end 63' of which may be engaged over the rim of a conventional dental drain basin. In lieu of the floating tube 26 shown in Fig. 1, the embodiment shown in Fig. 4 has a somewhat shortened tube 64 closed at its bottom end by a hollow ball 65 which normally extends downwardly into the chamber provided by the cylindrical member 48 to approximately the top of the funnel 55. Tube 64 is formed with an open window 66 therein which is preferably covered with wire gauze 67. The top of the floating tube 64 is provided with an operating arm 33, as in Fig. 1, adapted to unseat the gravity-activated switch 31 after the float has been raised by the accumulation of a predetermined amount of liquid in the cylindrical member 48. Preferably, the cylindrical member 48 is of a length above the head 49 so as to completely enclose the head and make contact with the under face of the bottom plate 15 on the housing 10 and provide a more pleasing appearance to the unit.

In the operation of the embodiment of the invention shown in Fig. 4, it will be realized that when the main switch 42 (shown in Fig. 1 but omitted from Fig. 4) is moved to "on" position, the motor blower will operate and create a suction action at the free tip of the aspirator tube and also within the chamber of the receptacle 47 and cause the valve disc 61 to move upwardly and close the opening 59' in the valve seat 59. When said aspirator is inserted into the mouth of a patent it will withdraw any saliva, blood, broken teeth, filling material, water, etc., when used in conjunction with the operating technique, which water and debris will be deposited and collected in the receptacle 47. The accumulation of collected waste in the receptacle 47 will continue as long as the motor of the blower is operating. As soon as the motor is manually shut off, the suction effect on the valve disc 61 is released, whereupon said disc will drop away from its seat and permit the collected waste to flow out through drain tube 63. Should the dental operating technique require the use of a large amount of water, it is conceivable that the collected waste liquid in the receptacle 48 will rise above the funnel and, in order to prevent such liquid from being drawn into the motor blower through the floating tube 64, the float 65 will raise said tube 64 to open the secondary switch 31, thus temporarily stopping the blower and the suction effect produced thereby and permit the collected fluid to drain out of the receptacle. Of course this will take but a few seconds and, when the floating tube again drops by gravity, the secondary switch will automatically close and the motor will again operate.

Figure 6:
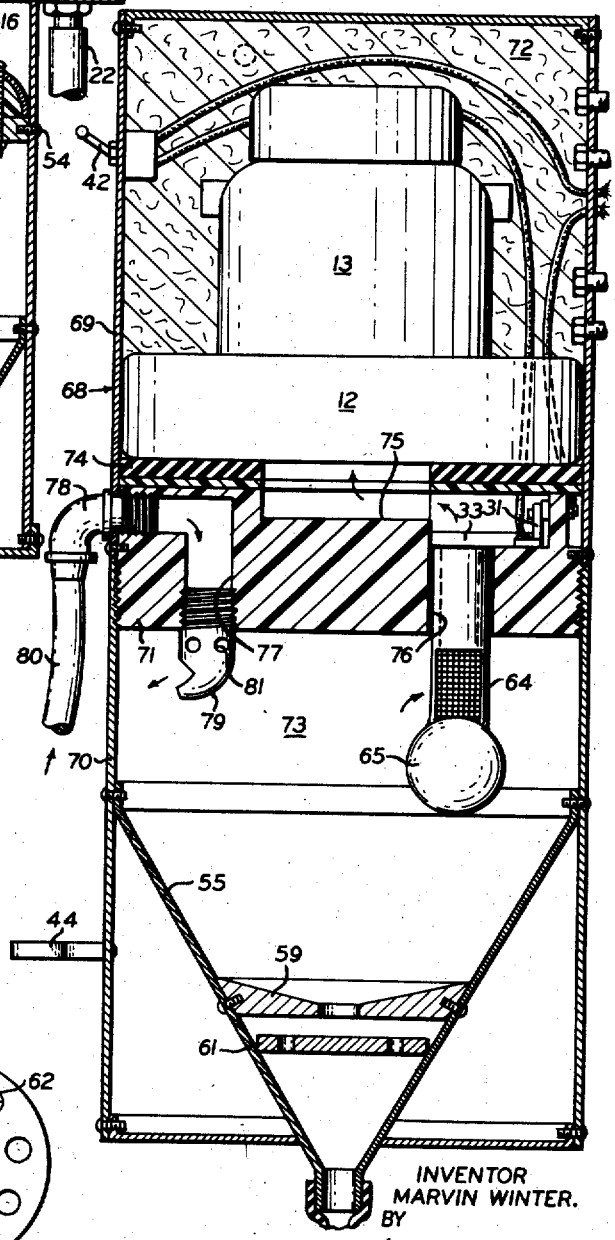
Fig. 6 shows a diametrical section through still another embodiment of my invention.
Figure 5:
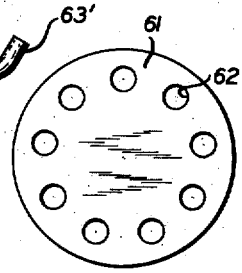
Fig. 5 is a plan view of a detail of the invention.

In the embodiment shown in Fig. 6 the entire unit has been streamlined and consists of a housing 68 formed by connecting the open ends of a pair of cup-like shells 69 and 70 together through the agency of a partition member 71 in any desired manner. The partition divides the housing into an upper chamber 72 and a lower chamber 73, there being mounted in the upper chamber the blower 12 and motor 13 on a cushion 74 in a manner quite analogous to that described in connection with Fig. 1, and the lower chamber is constructed in a manner quite analogous to the receptacle 47 without the head 49 being mounted therein. The partition member 71 may be conveniently formed of molded plastic material and is formed with a recess 75 in its top face and with a connecting bore 76 through which air communication is established between the lower chamber and the intake side of the blower 12. Mounted in the recess 75 is a secondary switch 31 operable by an arm 33 at the upper end of a floating tube 64 in a manner shown and described in Fig. 4. Also formed in the partition 71 is a duct 77, to the opposite ends of which are connected an elbow fitting 78 and a discharge nozzle 79 respectively for establishing fluid communication between the chamber 73 and an aspirator conduit 80 exteriorly of the chamber. The discharge nozzle 79 may be formed with lateral openings 81 to more effectively distribute the air under pressure entering the chamber 73 and thereby avoid splashing of the liquid collected in said chamber, especially when the level of said liquid approaches the float ball 65.

The operation of the unit shown in Fig. 6 is precisely the same as that shown in Fig. 4.

From the foregoing detailed description it will be apparent that I have provided various exceedingly simple, compact and unitary power-operated dental aspirator units satisfying the various objects recited in the opening statement of this specification, and, while I have shown and described certain preferred embodiments of my invention, it will be understood that changes in details of construction may be made thereto within the range of mechanical and engineering skill without departing from the spirit of the invention as hereinafter claimed.

What I claim is:

1. A power-operated dental aspirator unit comprising a housing, an electric motor-operated blower within said housing, a chamber below said blower, means providing air communication between said chamber and the intake side of the blower, an aspirator conduit positioned exteriorly of the chamber, means for establishing fluid communication between the chamber and the aspirator conduit, said chamber being adapted to receive and collect liquid and debris drawn through the aspirator conduit, a normally closed switch controlling the current to the blower and means extending into the chamber operable to open said switch when a predetermined amount of the liquid has collected in the chamber.

2. A dental aspirator according to claim 1, wherein there is a partition within the housing upon which the motor-operated blower is supported, and the space between the motor and the walls and top of the housing is packed with an air permeable sound-insulating material.

3. A dental aspirator according to claim 1, wherein there is a partition within the housing upon which the motor-operated blower is supported and said housing has means for supporting the unit onto an upright supporting structure.

4. A dental aspirator according to claim 1, wherein the means which extend into the chamber and are operable to open said switch is a float adapted to be raised when the liquid collected in the chamber has reached a predetermined level.

5. A dental aspirator according to claim 4, wherein the float comprises a hollow tube having an opening through its wall and a closed bottom, and constitutes the means for providing air communication between the chamber and the intake side of the blower.

6. A power-operated dental aspirator unit comprising a canister-like housing, an electric motor-operated blower mounted in said housing, the lower end of the housing having attached thereto a receptacle closure cap facing outwardly adapted to receive and hold a receptacle providing a chamber, said lower end of the housing and the cap having two sets of registering openings therethrough, an aspirator conduit leading from exteriorly of the housing through one set of openings and the second set of openings communicating with the air intake of the blower.

7. A dental aspirator unit according to claim 6, wherein a normally closed switch which controls the current to the motor is mounted within the housing in proximity to the second set of registering openings and float means extend through said openings and is adapted to open said switch when the float means has been raised a predetermined amount by the liquid collected in the receptacle.

8. A dental aspirator unit according to claim 6, wherein a tube extends through the second set of openings and is adapted to extend down to near the bottom of a receptacle when connected to the cap, and said tube has an opening through its wall in proximity to the cap.

9. A dental aspirator unit according to claim 6, wherein a floating tube having a closed bottom telescopically extends through the second set of openings and is adapted to extend down to near the bottom of the receptacle when connected to the cap, said tube has an opening through its wall in proximity to the cap, an electric switch which is gravity-actuated to closed position controls the current to the motor is mounted within the housing in proximity to the upper end of the floating tube, and means operable by the floating tube to open said switch when the floating tube has been raised a predetermined amount by liquid collected in the receptacle.

10. A power-operated dental aspirator unit comprising a housing, an electric motor-operated blower within said housing, a chamber below said blower, means providing air communication between said chamber and the intake side of the blower, an aspirator conduit leading from the exterior of the housing to the chamber, said chamber being adapted to receive and collect liquid and debris drawn through the aspirator conduit, means controlling operation of said blower and operable in accordance with a predetermined liquid level in said chamber to stop said blower, and means for opening said chamber for discharging the liquid and debris collected therein.

11. A dental aspirator according to claim 10, wherein the means for discharging the liquid and debris from the chamber comprises a drain outlet in said chamber and valve means controlling said drain outlet.

12. A dental aspirator according to claim 11, wherein the valve means is a normally open check valve which is adapted to close by the suction effect produced in the chamber when the blower is operating and to open upon cessation of such operation.

13. A dental aspirator according to claim 12, wherein the housing is a canister-like member which has a partition therein which forms with the lower portion of the housing the chamber adapted to receive and collect liquid and debris drawn through an aspirator tube and also a support for the blower and said partition has an opening therethrough which provides for air communication between the chamber and the intake side of the blower.

14. A dental aspirator according to claim 12, wherein a manually operable primary switch and a normally closed secondary switch control the current to the blower, and means extend into the chamber and is operable to open said secondary switch when a predetermined amount of liquid has collected in the chamber.

15. A dental aspirator according to claim 14, wherein the means which is operable to open said secondary switch includes a float which becomes operable when the collected liquid in the chamber has attained a predetermined level.

[16. A power-operated dental aspirator unit comprising a housing, an electric motor operated blower within said housing, a chamber within said housing, means providing air communication between said chamber and the intake side of the blower, an aspirator conduit, means for establishing fluid communication between the aspirator conduit and the chamber, said chamber being adapted to receive and collect liquid and debris drawn through the aspirator conduit, means for controlling the blower and operable upon a predetermined amount of liquid collecting in said chamber to cut off said blower.]

[17. A dental aspirator according to claim 16 provided with means for preventing collected liquid and debris from being drawn into the blower.]

[18. A compact unitary power-operated dental aspirator unit comprising a canister-like housing, an electric motor operated blower within said housing, a chamber within said housing, said chamber being removable for cleaning, means providing air communication between said chamber and the intake side of the blower, an aspirator conduit, means for establishing fluid communication between the aspirator conduit and the chamber, said chamber being adapted to receive and collect liquid and debris drawn through the aspirator conduit, means preventing collected liquid and debris from being drawn into the blower, and means for controlling the blower operable upon a predetermined amount of liquid collecting in said chamber to cut off said blower.]

*19. A power-operated dental aspirator unit comprising a housing, an electric motor-operated blower within said housing, a chamber below said blower, means providing air communication between said chamber and the intake side of the blow, an aspirator conduit leading from the exterior of the housing to the chamber, said chamber being adapted to receive and collect liquid and debris drawn through the aspirator conduit, a drain outlet in said chamber for discharging the liquid and debris collected therein, and valve means operable in response to a predetermined amount of suction produced in the chamber by the operation of the blower to close said drain outlet and to open upon a decrease in the suction effect within the chamber below said predetermined amount.*

References Cited in the file of this patent or the original patent

UNITED STATES PATENTS 2,784,717 Thompson ---------- Mar. 12, 1957

FOREIGN PATENTS 901,461 Germany ---------- Jan. 11, 1954